United States Patent Office 3,166,934
Patented Jan. 26, 1965

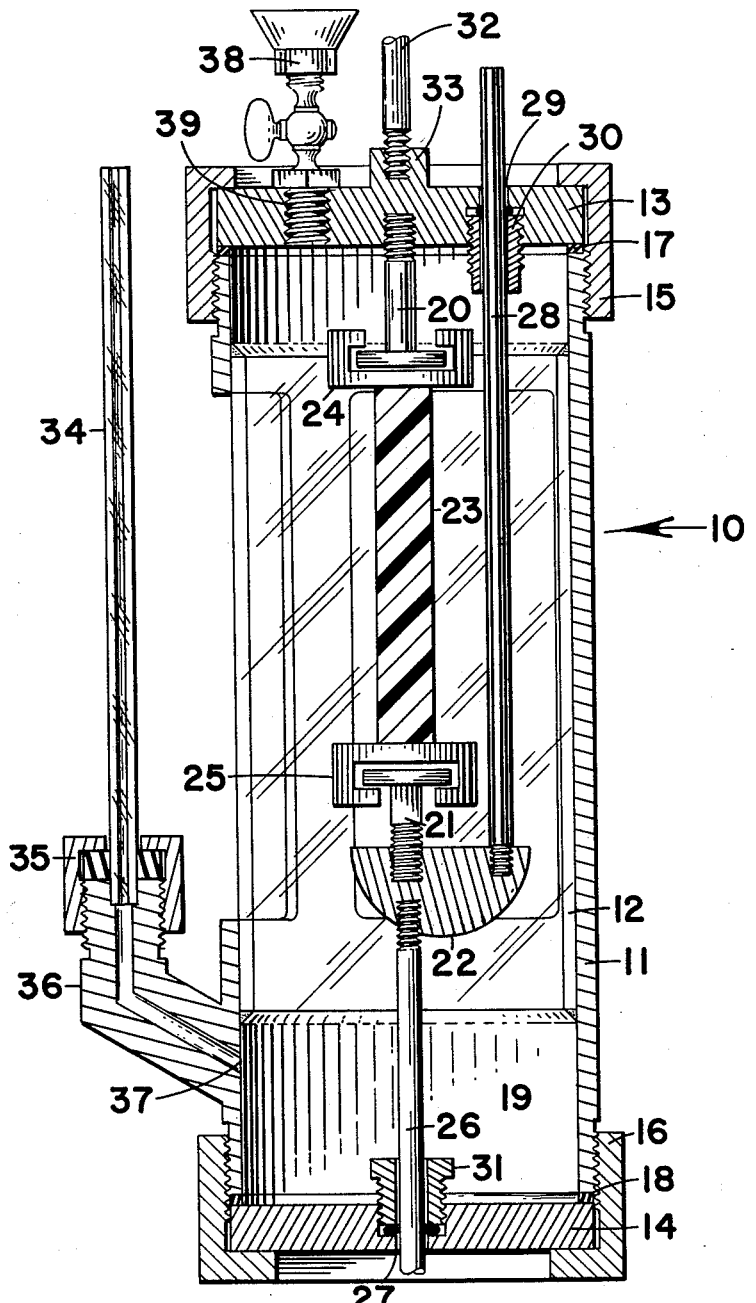

3,166,934
LIQUID DISPLACEMENT STRAIN INDICATOR
Robert B. Kruse, Huntsville, Ala., and John B. Baldwin, San Jose, Calif., assignors to Thiokol Chemical Corporation, Bristol, Pa., a corporation of Delaware
Filed June 22, 1962, Ser. No. 204,402
14 Claims. (Cl. 73—94)

This invention relates to instruments for determining the mechanical properties of elastomeric materials, and more particularly to an instrument for measuring the change in volume of an elastomeric material during straining.

Elastomeric materials frequently undergo a change in volume when subjected to strains either in tension or compression. The extent of the volume change and its relation to imposed strain is of extreme importance in the engineering analysis and use of such materials. Accurate values of volume change are particularly useful, in conjunction with strain values, for determining Poisson's ratio for elastomeric materials.

Previously, the volume change of elastomeric materials has been determined by direct measurement of the dimensions of an elastomeric specimen being strained. This process, particularly with the requisite accuracy, suffers from a number of obvious disadvantages. A crude type of dilatometer, in which the change in volume is indicated by movement of a float in a liquid-filled tank, has been used in an attempt to overcome some of the problems inherent in the direct dimensional measurement method. This dilatometer, while somewhat more simple in operation, does not offer any improvement in accuracy over direct dimensional measurement.

It is, therefore, an object of this invention to provide a strain dilatometer whereby the change in volume of an elastomeric material being strained may be accurately measured.

The single figure is a view, partly in section, of one embodiment of the present invention. A strain dilatometer 10 comprises, in part, a tubular metal member 11 having portions of its walls cut away, a transparent tubular member 12 bonded within the member 11, and a pair of closures 13 and 14, held by a pair of retaining rings 15 and 16 detachably threaded onto the tubular member 11. Sealing means 17 and 18 interposed between the ends of the tubular member 11 and the closures 13 and 14 provide a liquid-tight seal. The tubular members 11 and 12 and the closures 13 and 14 together define a chamber 19 which may be filled with a suitable liquid.

Axially aligned within the chamber 19 are a fixed specimen support 20 removably threaded into the closure 13, a movable specimen support 21 removably threaded into a movable support member 22, and a specimen of elastomeric material 23, adhesively bonded to a pair of specimen holders 24 and 25 detachably engaging with the specimen supports 20 and 21.

An axially aligned tensioning rod 26, removably threaded into the movable support member 22, reciprocally passes through an opening 27 in the closure 14. A compensating rod 28 having the same diameter as the tensioning rod 26, reciprocally passes through an opening 29 in the closure 13 and is removably threaded into the support member 22. Suitable packing glands 30 and 31 are provided in the closures 13 and 14, forming low-friction, liquid tight seals through which the tensioning rod 26 and the compensating rod 28 may reciprocally pass.

An attachment member 32 is removably threaded into a boss 33 of the closure 13 in coaxial alignment with the fixed specimen support 20. The attachment member 32 and the tensioning rod 26 are adapted to detachably receive attachment means, not shown, for connection to a suitable straining device, such as an "Instron Tester."

A volume calibrated transparent capillary tube 34, detachably sealed by a suitable fitting 35 into a tubular sidearm 36 mounted on the tubular member 11, communicates with the chamber 19 through a port 37.

A filling petcock 38, removably threaded into an opening 39 in the closure 13, is provided whereby the chamber 19 and the major portion of the capillary tube 34 may be filled with a suitable liquid.

A number of obvious alternatives will immediately be apparent to one having ordinary skill in the art. For example, the tubular members 11 and 12 could be replaced by a single member, of either transparent or opaque, metal or non-metallic material. It is also possible to fabricate an equivalent structure from a plurality of parts. The form of the closures 13 and 14 and their associated parts shown in the figure is illustrative only. Any of several means of effecting a liquid-tight closure common in the art are equivalent to the means shown.

Assembly of the strain dilatometer will obviously be affected by the particular form of the various parts, but will generally follow the procedure used with the embodiment described and shown in the drawing. In routine use, the strain dilatometer is maintained as three sub-assemblies: an upper closure assembly, a body assembly, and a lower closure rod assembly. The various parts which are incorporated into each of these sub-assemblies should be apparent from the drawing.

When an elastomeric specimen is to be tested, one of the holders 25 to which it is bonded is engaged with the movable specimen support 21. The lower closure rod assembly is then assembled to the body assembly with the threads of tubular member 11 and retaining ring 16 loosely engaged. The tensioning rod 26 is pushed inwardly until the unengaged specimen holder 24 is at or beyond the open end of the body assembly.

The upper closure assembly is passed over the compensating rod 28 and the specimen holder 24 engaged with the fixed specimen support 20. The tensioning rod 26 is then carefully withdrawn until the closure 13 is seated on the tubular member 11 with sealing means 17 interposed. The retaining ring 15 is threaded onto the tubular member 11 and both the retaining rings 15 and 16 are made tight. The chamber 19 is then filled with a suitable liquid, such as a silicone oil, by way of filling petcock 38. The capillary tube 34 communicating with the chamber 19, is simultaneously filled to the same level as the chamber 19.

The strain dilatometer may now be connected to a suitable straining device. Depending upon the type of straining device used, it may not be necessary to disconnect the strain dilatometer when changing elastomeric specimens. The upper closure assembly could, for example, remain connected to the upper crosshead of an "Instron Tester."

Operation of the strain dilatometer is essentially the same, and without regard to the particular form. Movement of the straining device with which the dilatometer is used causes the tensioning rod 26 to move axially. The separation between the specimen supports 20 and 21 is thus increased when tensile strain is being applied, and is decreased when compressive strain is being applied.

As the tensioning rod 26 is withdrawn from the chamber 19, an equal length of the compensating rod 28 is drawn into the chamber 19. Since these rods are made to have the same diameter, the volume of the compensating rod 28 entering the chamber 19 is the same as the volume of the tensioning rod 26 leaving the chamber 19. The net volume of the tensioning rod 26 plus the compensating rod 28 within the chamber 19 is therefore constant, and no liquid is displaced from the chamber 19 by the movement of the tensioning rod 26. While this example illustrates the function and action of the compensating rod 28 when tensile strain is being applied, it is obvious that analogous action takes place when compressive strain is being applied.

The only thing, therefore, which can effect a change in the displaced volume within the chamber 19 is the elastomeric specimen 23. When the specimen increases in volume, liquid is displaced from the chamber 19 into the capillary tube 34. When the specimen decreases in volume, liquid is displaced into the chamber 19 from the capillary tube 34. The changes in volume, as indicated by changes in liquid level in the capillary tube 34, can be observed and recorded manually or by suitable instrumentation such as is known in the art.

While the present invention has been described by means of specific example and in a specific embodiment, it should not be limited thereto, for obvious modifications will occur to those skilled in the art without departing from the spirit of the invention or the scope of the subjoined claims.

What is claimed is:

1. A liquid-displacement strain indicator for measuring the change in volume of an elastomeric material being strained, comprising a hollow, liquid-filled container having therein a fixed and a movable specimen holding means for applying a deforming force to the elastomeric material, and a compensating means cooperating with said movable means to maintain a constant volume of said movable and said compensating means within said container.

2. A liquid-displacement strain indicator for measuring the change in volume of an elastomeric material being strained, comprising a hollow, liquid-filled container having therein a fixed and a movable means for applying a deforming force to the elastomeric material, a compensating means cooperating with said movable means to maintain a constant volume of said movable and said compensating means within said container, and a liquid-volume measuring means communicating with the interior of said container.

3. A liquid-displacement strain indicator for measuring the change in volume of an elastomeric material being strained, comprising a hollow, liquid-filled container having axially aligned therein a fixed and a movable means for applying a deforming force to the elastomeric material, and a compensating means cooperating with said movable means to maintain a constant volume of said movable and said compensating means within said container.

4. A liquid-displacement strain indicator for measuring the change in volume of an elastomeric material being strained, comprising a hollow, liquid-filled container having axially aligned therein a fixed and a movable means for applying a deforming force to the elastomeric material, a compensating means cooperating with said movable means to maintain a constant volume of said movable and said compensating means within said container, and a liquid-volume measuring means communicating with the interior of said container.

5. A liquid-displacement strain indicator for measuring the change in volume of an elastomeric material being strained, comprising a hollow, liquid-filled container having axially aligned therein a fixed and a movable means for applying a deforming force to the elastomeric material and a compensating means aligned in spaced parallel relation to the axis cooperating with said movable means for applying strain to the elastomeric material, to maintain a constant volume of said movable and said compensating means within said container, and a liquid-volume measuring means communicating with the interior of said container.

6. A liquid-displacement strain indicator, as in claim 5, wherein said hollow, liquid-filled container is cylindrical.

7. A liquid-displacement strain indicator for measuring the change in volume of an elastomeric material being strained, comprising a hollow, liquid-filled container having axially aligned therein a fixed and a movable means for applying a deforming force to the elastomeric material, a compensating means aligned in spaced parallel relation to the axis cooperating with said movable means to maintain constant volume of said movable and said compensating means within said container, and a liquid-volume measuring means communicating with the interior of said container.

8. A liquid-displacement strain indicator, as in claim 7, wherein said hollow, liquid-filled container is cylindrical.

9. A liquid-displacement strain indicator for measuring the change in volume of an elastomeric material being strained, comprising a hollow, liquid-filled container having axially aligned therein a fixed and a movable means for applying a deforming force to the elastomeric material, means communicating with the interior of the container responsive to variations in the volume of the liquid, and a compensating means aligned in spaced parallel relation to the axis cooperating with said movable means to maintain a constant volume of said movable and said compensating means within said container, each of said movable and said compensating means within said container including a rod having the same diameter.

10. A liquid-displacement strain indicator, as in claim 9, wherein said hollow, liquid-filled container is cylindrical.

11. A liquid-displacement strain indicator for measuring the change in volume of an elastomeric material being strained, comprising a hollow, liquid-filled container having axially aligned therein a fixed and a movable means for applying a deforming force to the elastomeric material, a compensating means aligned in spaced parallel relation to the axis cooperating with said movable means to maintain a constant volume of said movable and said compensating means within said container, each of said movable and said compensating means including a rod having the same diameter, and a liquid-volume measuring means communicating with the interior of said container.

12. A liquid-displacement strain indicator, as in claim 11, wherein said hollow, liquid-filled container is cylindrical.

13. A liquid-displacement strain indicator for measuring the change in volume of an elastomeric material being strained, comprising a hollow, liquid-filled container having axially aligned therein a fixed and a movable means for applying a deforming force to the elastomeric material, a compensating means aligned in spaced parallel relation to the axis cooperating with said movable means to maintain a constant volume of said movable and said compensating means within said container, each of said movable and said compensating means including a rod having the same diameter, and a transparent, volume-calibrated capillary measuring means communicating with the interior of said container.

14. A liquid-displacement strain indicator, as in claim 13, wherein said hollow, liquid-filled container is cylindrical.

References Cited by the Examiner

UNITED STATES PATENTS 1,125,236   1/15   Whiting _____ 73—88 X

RICHARD C. QUEISSER, *Primary Examiner.*